US005238770A

United States Patent [19]

Creatura et al.

[11] Patent Number: 5,238,770

[45] Date of Patent: Aug. 24, 1993

[54] APPARATUS FOR THE PREPARATION OF CARRIER PARTICLES

[75] Inventors: John A. Creatura, Ontario; Thomas J. Budny, Penfield, both of N.Y.

[73] Assignee: Xerox Corporation, Stamford, Conn.

[21] Appl. No.: 733,541

[22] Filed: Jul. 22, 1991

[51] Int. Cl.[5] .......................... G03G 5/00; G03G 9/00; B32B 9/00; B05D 7/00

[52] U.S. Cl. .................................... 430/137; 430/109; 428/407; 427/221

[58] Field of Search ................ 430/108, 137; 427/221; 428/407

[56] References Cited

U.S. PATENT DOCUMENTS

| | | | |
|---|---|---|---|
| 3,642,118 | 2/1972 | Komylak | 198/41 |
| 4,223,085 | 9/1980 | Hagenbach et al. | 430/108 |
| 4,283,438 | 8/1981 | Lee | 427/47 |
| 4,478,925 | 10/1954 | Miskinis | 430/137 |
| 4,788,080 | 11/1988 | Hojo et al. | 427/221 X |

*Primary Examiner*—Marion E. McCamish
*Assistant Examiner*—Stephen Crossan
*Attorney, Agent, or Firm*—E. O. Palazzo

[57] ABSTRACT

An apparatus for obtaining carrier particles which comprises in operative relationship a container means, a rotating means, a moving transporting means in contact with the container means and the rotating means, and a magnet means attached to the transporting means.

8 Claims, 1 Drawing Sheet

APPARATUS FOR THE PREPARATION OF CARRIER PARTICLES

BACKGROUND OF THE INVENTION

This invention is generally directed to an apparatus or device, and processes for the preparation of carrier particles and developer compositions thereof; and more specifically, the present invention relates to the preparation of coated carrier particles by the selection of magnetic field agitation. In one embodiment of the present invention, coated carrier particles are supplied to a known kiln by magnets attached to, for example, a continuous transporting means positioned external to the kiln, which magnets attract, subsequently release, and agitate the carrier mixture in the kiln permitting, for example, the avoidance or minimization of agglomeration thereby enabling better flow characteristics for carrier particles. With present carrier devices and processes, there can be formed an undesirable mass. More specifically, with many present carrier processes and devices the carrier can be subject to problems of bead sticking, undesirable adhesion of carrier beads to a kiln wall within which they are contained projection caused by the melting of polymer carrier coatings, sluggishness and poor flow causing loss of particle size control, product nonuniformity, and in some instances total process termination. Bead sticking can be caused, for example, by adhesion of the carrier beads to each other caused by, for example, melting polymer coatings. The aforementioned and other problems are avoided or minimized with the devices and processes of the present invention. The carrier particles prepared with the devices and processes of the present invention can be comprised of a core with a coating comprised of a mixture of polymers enabling insulating particles with relatively constant conductivity parameters, and also wherein the triboelectric charge on the carrier can vary significantly depending on the coatings selected. Developer compositions comprised of the aforementioned carrier particles and toner particles are useful in electrostatographic or electrophotographic imaging systems, especially xerographic imaging and printing processes. Additionally, developer compositions comprised of substantially insulating carrier particles prepared in accordance with the process and devices of the present invention can be useful in imaging methods wherein relatively constant conductivity parameters are desired. Furthermore, in the aforementioned imaging processes the triboelectric charge on the carrier particles can be preselected depending on the polymer composition applied to the carrier core.

Carrier particles for use in the development of electrostatic latent images, and processes for the preparation thereof are described in many patents including, for example, U.S. Pat. No. 3,590,000. These carrier particles may be comprised of various cores, including steel, with a coating thereover of fluoropolymers; and terpolymers of styrene, methacrylate, and silane compounds. These carrier particles can be prepared by, for example, solution coating methods.

There are also illustrated in U.S. Pat. No. 4,233,387, the disclosure of which is totally incorporated herein by reference, coated carrier components for electrostatographic developer mixtures comprised of finely divided toner particles clinging to the surface of the carrier particles. Specifically, there is disclosed in this patent coated carrier particles obtained by mixing carrier core particles of an average diameter of from between about 30 microns to about 1,000 microns with from about 0.05 percent to about 3.0 percent by weight, based on the weight of the coated carrier particles, of thermoplastic resin particles. The resulting mixture is then dry blended until the thermoplastic resin particles adhere to the carrier core by mechanical impaction, and/or electrostatic attraction. Thereafter, the mixture is heated to a temperature of from about 320° F. to about 650° F. for a period of 20 minutes to about 120 minutes, enabling the thermoplastic resin particles to melt and fuse on the carrier core. Dry coating carrier processes are also illustrated in U.S. Pat. Nos. 4,937,166 and 4,935,326, the disclosures of which are totally incorporated herein by reference. Subsequent to the aforementioned dry coating, the carrier particles can be introduced into a kiln for the primary purpose of ensuring the permanent fusing and fixing of the polymer coatings to the carrier core. The aforementioned kiln process, especially at high polymer coating weights, for example of 3 percent, results in some instances in the disadvantages of bead sticking, sluggishness, and carrier particles with poor flow. Poor flow of carrier can be caused by bead sticking, and can result in nonuniform temperature profiles when heating the carrier core and carrier polymer or polymers, and the like. These and other disadvantages are minimized or avoided with the devices and processes of the present invention.

In a patentability search report the following United States Patents were recited: U.S. Pat. No. 4,223,085 which discloses nickel carrier particles wherein a furnace, such as a rotary kiln, may be employed to heat treat the carrier, which carrier may be agitated, see for example column 5, lines 22 to 38; U.S. Pat. No. 4,478,925 discloses the preparation of magnetic carrier particles by agitating a dry mixture of carrier particles and resin particles in a magnetic field, followed by heating of the aforementioned mixture, reference the Abstract; in a preferred process embodiment, see column 4, of the '925 patent there is described an apparatus with a housing or container in which are mounted one or more cylindrical roller members which rotate coaxially about a set of stationary magnets arranged within the roller member, referred to as a sleeve or shell; a supply of developer is placed within the housing and is attracted magnetically to the surface of the rotating roller with agitation of the mixture of carrier particles and toner particles occurring as the rollers rotate about the magnets in the housing; and U.S. Pat. No. 4,283,438, which discloses a method for encapsulating magnetic particles by enclosure within oil drops, mixing in an aqueous solution and dispersing the oil drops with the enclosed particles by application of an alternating magnetic field.

Other patents relating to carriers and processes for the preparation thereof include, for example, U.S. Pat. No. 3,939,086, which teaches steel carrier beads with polyethylene coatings, see column 6; U.S. Pat. No. 4,264,697, which discloses dry coating and fusing processes; U.S. Pat. Nos. 3,533,835; 3,658,500; 3,798,167; 3,918,968; 3,922,382; 4,238,558; 4,310,611; 4,397,935 and 4,434,220.

SUMMARY OF THE INVENTION

It is a feature of the present invention to provide an apparatus and process for the preparation of carrier particles containing a polymer mixture coating.

In another feature of the present invention there is provided an apparatus for the controlled heating and/or cooling of carrier particles wherein there is eliminated the disadvantages of the prior art mentioned herein.

Another feature of the present invention relates to an apparatus for the magnetic lifting, agitation, and subsequent release of coated carrier particles in, for example, a known rotary kiln.

Another feature of the present invention relates to an apparatus for the magnetic lifting, agitation, and subsequent release of coated carrier particles in, for example, a known rotary kiln and wherein the coated carrier particles can separate in some instances into single particles thereby promoting the flow characteristics.

In another feature of the present invention there are provided apparatuses and processes for generating coated carrier particles of substantially constant conductivity parameters.

In yet another feature of the present invention there are provided processes for the preparation of carrier particles in a heated apparatus, such as a known kiln with a transporting means in contact therewith and external magnets attached to the transporting means.

In yet another feature of the present invention there are provided economical processes and apparatuses for the preparation of coated carrier particles in a heated apparatus, such as a known kiln, which kiln is in contact with a rotating transporting means, such as a transporting belt with magnets attached to the aforementioned means.

In yet a further feature of the present invention there are provided carrier particles comprised of a coating with a mixture of polymers that are not in close proximity, that is for example, a mixture of polymers from different positions in the triboelectric series.

In still a further feature of the present invention there are provided carrier particles of insulating characteristics comprised of a core with a coating thereover generated from a mixture of polymers.

Further, in an additional feature of the present invention there are provided carrier particles comprised of a core with a coating thereover generated from a mixture of polymers wherein the triboelectric charging values are from between about −10 microcoulombs to about −70 microcoulombs per gram at the same coating weight.

In another feature of the present invention there are provided methods for the development of electrostatic latent images wherein the developer mixture comprises carrier particles with a coating thereover comprised of a mixture of polymers that are not in close proximity in the triboelectric series.

Also, in another feature of the present invention there are provided processes for obtaining carrier particles by the selection of a magnetic lifting method, and wherein magnetic carrier powder particles are lifted, or attracted to magnets, agitated, and permitted to separate into, for example, single particles thereby enhancing the flow thereof.

These and other features of the present invention can be accomplished by providing processes and apparatuses for the preparation of carrier particles, wherein the carrier particles can be comprised of a core with a coating thereover comprised of a mixture of polymers. More specifically, the carrier particles can be prepared, or obtained by introducing low density porous magnetic, or magnetically attractable metal core carrier particles with from, for example, between about 0.05 percent and about 3 percent by weight, based on the weight of the coated carrier particles, of a mixture of polymers in a suitable container like a kiln, such as a known rotary kiln, like Harper Model NOV7078-RT-18, 7 inches, available from Harper Electric Furnace Company of Lancaster, N.Y., which kiln is in contact with a transporting means with magnets attached thereto, whereby, for example, carrier particles are attracted to the magnets at one position in the kiln, and released, or returned to the kiln carrier mixture at a second different position in the kiln. In this manner the carrier particles are heated, agitated, separated, and cooled in a controlled manner to enable the advantages mentioned herein, including avoiding or minimizing the formation of undesirable carrier agglomerates, and the like as illustrated herein, for example. The carrier particles with polymeric coatings thereon are usually provided to the kiln from an entry tube attached to a furnace wherein the carrier core particles and polymers are heated to a temperature, for example, of between from about 200° F. to about 550° F. for a period of from about 10 minutes to about 60 minutes enabling the polymers to melt and fuse to the carrier core particles.

DESCRIPTION OF THE FIGURES

There are is illustrated in FIG. 1 and 2 embodiments of the apparatuses and processes of the present invention.

Figure 1:
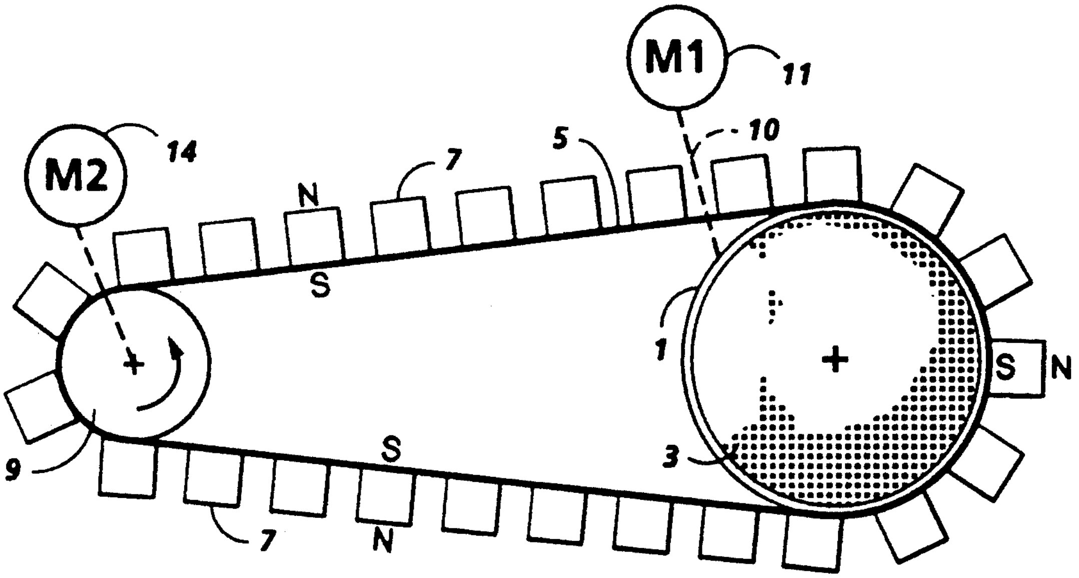
In FIG. 1 there is illustrated an apparatus of the present invention comprised of a container means 1, such as a rotary kiln; a mixture 3 comprised of coated carrier particles; a moving transporting means 5, such as a transporting belt; magnets 7 attached to the transporting means; roller means 9; power means, such as a motor 11, and power means, such as a motor 14, and a connection means 10, such as a wire. In operation in an embodiment, a portion of the magnetic carrier mixture is attracted to the magnets at the 6 O'clock position, and released at about the 12 o'clock position as shown. The transporting means speed can vary, however typically it is from between about 1 to about 100, and preferably from about 6 to about 60 feet per minute. Various effective kiln and roller speeds can be selected, such as for example from about 1 to about 30, and preferably from about 2 to about 10 revolutions per minute (RPM) for the kiln, and from about 0.5 to about 50 and preferably from about 3 to about 30 RPM for the roller means. Magnet strength depends on a number of factors; generally, however, this strength is from about 10 to about 40 mega oersteds, and preferably from about 25 to about 35. Also, the number of magnets depend, for example, on the size of the kiln, and the like; generally, however, a sufficient number of magnets is selected, for example from about 15 to about 50 in ten rows that will enable carrier lifts of from about 3 to about 270 lifts per minute for a 7 inch kiln, such as that of FIG. 1. Lift in embodiments refers to a single pass by one magnet through the powder bed of coated carrier particles contained at the bottom (6 o'clock position) of the kiln, reference FIGS. 1 and 2, followed by raising the powder from the bed by magnetic attraction, and subsequently transporting the powder along the inner tube wall of the kiln to the top thereof, the 12 o'clock position, where the magnetic force is removed and the resulting powder is allowed to drop by gravitational force into the kiln at the 6 o'clock position. A seven inch diameter kiln operates with a variety of effective lifts, for example from about 10 to about 20 lifts per minute. With each lift an effective amount of the carrier powder mixture is transported, for example from about 5 to about 15 percent of the total present.
Figure 2:
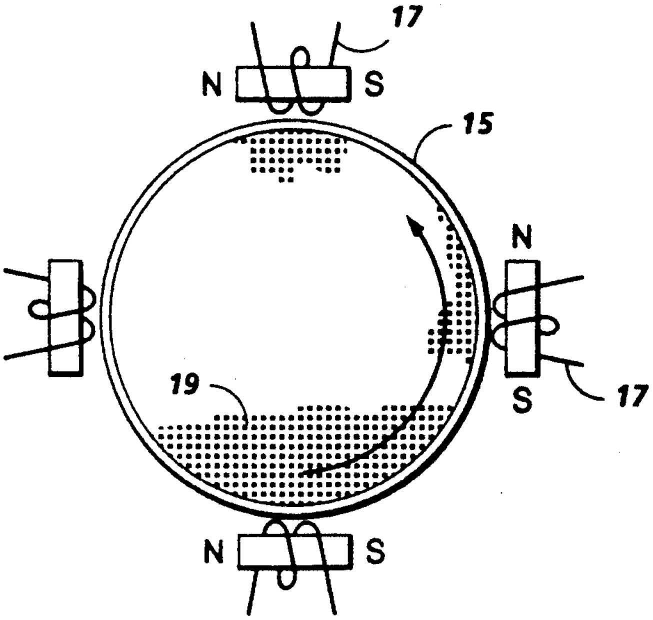
In FIG. 2 there is illustrated an apparatus of the present invention comprised of similar components as mentioned in FIG. 1 with the primary exception that there are selected electromagnets attached to the kiln wall. More specifically, in FIG. 2 there is illustrated a kiln means 15, electromagnets 17, and carrier particles 19 comprised of carrier cores coated with a polymer mixture. As the kiln rotates in a counterclockwise direction, the magnets are turned on by passing current through the field coil at the 6 o'clock position as shown, and turned off at the 12 o'clock position by disconnecting the current. In operation, in an embodiment about 25 percent of the bed contents comprised of a mixture of carrier cores, such as iron powder and polymer coatings, is lifted. The rotation speed of the kiln can be, for example, from about 1 to about 30 revolutions per minute with the strength of each magnet being from, for example, about 15 to about 20 mega oresteds.

There is illustrated herein an apparatus of the present invention wherein there is provided to the container of FIG. 1 a mixture comprised of carrier particles with a fused coating thereon comprised of a mixture of, for example, two polymers, such as polyvinylidene fluoride (KYNAR®) and polymethyl methacrylate, reference U.S. Pat. Nos. 4,937,166 and 4,935,326, the disclosures of which are totally incorporated herein by reference, from a furnace with an exit tube.

Embodiments of the present invention include an apparatus for obtaining carrier particles which comprises in operative relationship a container means, a roller means, a moving transporting means in contact with the container means and the roller means, and a magnet means attached to the transporting means, whereby a portion of the carrier particles are lifted by the magnets, cooled while travelling on the transporting means, and released, or returned to the container when the magnets strength is reduced or eliminated, usually at the 12 o'clock position; an apparatus for agitating and cooling carrier particles which comprises in operative relationship a container means, a rotating means, a moving transporting means in contact with the container means and the rotating means, and a series of magnets attached to the transporting means, whereby the magnets attract and retain carrier components present in the container means, followed by release of the carrier components into the container means; and a process for the preparation of carrier particles which comprises adding to the apparatus of FIG. 1, a mixture comprised of carrier particles coated with a polymer, or coated with a mixture of polymers, and rendering operative the apparatus as illustrated herein.

Examples of containers include known kilns with, for example, a diameter of from about 3 to about 36 inches, which kilns are available, for example, from Harper Electric Furnace Company of New York.

Examples of known transporting means include, for example, belts comprised of rubber, plastic, nonmagnetic metal alloys, such as stainless steel, TEFLON®, reinforced VITON® and the like. The transporting means can move at various effective speeds; generally this speed, however, is from between about 5 to about 100, and preferably from about 6 to about 60 feet per minute.

Magnets that can be selected are known and include, for example, magnetites, iron containing rare earth metals, such as neodymium, samarium, which may be combined with other elements such as cobalt, boron, and the like.

Rotating or roller means include a number of known materials such as plastic, aluminum, ceramics, rubbers, and the like. This roller means is usually continuously driven at a speed of from about 3 to about 30 RPM by a motor means. Also, the container, such as the kiln, can be driven at a speed of from about 2 to about 20 RPM and wherein the aforementioned roller is disengaged.

The carrier particles selected and obtained can be comprised in embodiments of a core with a coating thereover comprised of a mixture of a first dry polymer component and a second dry polymer component, which are not in close proximity in the triboelectric series. Therefore, the aforementioned carrier compositions can be comprised of known core materials including iron, steel, and the like with a dry polymer coating mixture thereover. Subsequently, developer compositions can be generated by admixing the aforementioned carrier particles with a toner composition comprised of resin particles and pigment particles.

Various suitable known solid core carrier materials can be selected. Characteristic core properties of importance include those that will enable the carrier to be attracted to the magnets, the toner particles to acquire a positive charge or a negative charge, and carrier cores that will permit desirable flow properties in the developer reservoir present in a xerographic imaging apparatus. Also of value with regard to the carrier core properties are, for example, suitable magnetic characteristics that will permit magnetic brush formation in mag brush development processes; and also wherein the carrier cores possess desirable mechanical aging characteristics. Examples of carrier cores that can be selected include iron, steel, ferrites, magnetites, nickel, and mixtures thereof. Preferred carrier cores include ferrites, and sponge iron, or steel grit with an average particle size diameter of from between about 30 microns to about 200 microns.

Illustrative examples of polymer coatings selected for the carrier particles include, for example, a single known polymer, or those that are not in close proximity in the triboelectric series. Specific examples of polymers, or mixtures that can be selected are KYNAR®; polyvinylidene fluoride with polyethylene; polymethyl methacrylate and copolyethylenevinylacetate; copolyvinylidene fluoride tetrafluoroethylene and polyethylene; polymethyl methacrylate and copolyethylene vinylacetate; and polymethyl methacrylate and polyvinylidene fluoride. Other related polymer mixtures not specifically mentioned herein can be selected providing the features of the present invention are achieved, including, for example, polystyrene and tetrafluoroethylene; polyethylene and tetrafluoroethylene; polyethylene and polyvinyl chloride; polyvinyl acetate and tetrafluoroethylene; polyvinyl acetate and polyvinyl chloride; polyvinyl acetate and polystyrene; and polyvinyl acetate and polymethyl methacrylate.

With further reference to the polymer coating mixture, by close proximity as used herein is meant in embodiments that the choice of the polymers selected is dictated by their position in the triboelectric series, therefore for example, one may select a first polymer with a significantly lower triboelectric charging value than the second polymer. For example, the triboelectric charge of a steel carrier core with a polyvinylidene fluoride coating is about −75 microcoulombs per gram.

However, the same carrier, with the exception that there is selected a coating of polyethylene, has a triboelectric charging value of about −17 microcoulombs per gram. More specifically, not in close proximity refers to first and second polymers that are at different electronic work function values, that is they are not at the same electronic work function value; and further, the first and second polymers are comprised of different components. Additionally, the difference in electronic work functions between the first and second polymer is at least 0.2 electron volt, and preferably is about 2 electron volts; and moreover, it is known that the triboelectric series corresponds to the known electronic work function series for polymers, reference "Electrical Properties of Polymers", Seanor, D. A., Chapter 17, *Polymer Science*, A. D. Jenkins, Editor, North Holland Publishing (1972), the disclosure of which is totally incorporated herein by reference.

The percentage of each polymer present in the carrier coating mixture can vary depending on the specific components selected, the coating weight and the properties desired. Generally, the coated polymer mixtures used contain from about 10 to about 90 percent of the first polymer, and from about 90 to about 10 percent by weight of the second polymer. Preferably, there are selected mixtures of polymers with from about 40 to 60 percent by weight of the first polymer, and from about 60 to about 40 percent by weight of a second polymer. In one embodiment when a high triboelectric charging value is desired, that is, exceeding −50 microcoulombs per gram, there is selected from about 90 percent by weight of the first polymer such as polyvinylidene fluoride, and 10 percent by weight of the second polymer such as polyethylene. In contrast, when a lower triboelectric charging value is desired, less than about −20 microcoulombs per gram, there is selected from about 10 percent by weight of the first polymer, and 90 percent by weight of the second polymer.

Illustrative examples of toner resins selected for the developer compositions include polyamides, epoxies, polyurethanes, diolefins, vinyl resins and polymeric esterification products of a dicarboxylic acid and a diol comprising a diphenol, styrene methacrylates, styrene acrylates, and styrene butadienes. Specific monomers that can be polymerized include styrene, p-chlorostyrene vinyl naphthalene, unsaturated mono-olefins such as ethylene, propylene, butylene and isobutylene; vinyl halides such as vinyl chloride, vinyl bromide, vinyl fluoride, vinyl acetate, vinyl propionate, vinyl benzoate, and vinyl butyrate; vinyl esters like the esters of monocarboxylic acids including methyl acrylate, ethyl acrylate, n-butyl acrylate, isobutyl acrylate, dodecyl acrylate, n-octyl acrylate, 2-chloroethyl acrylate, phenyl acrylate, methylalphachloracrylate, methyl methacrylate, ethyl methacrylate, and butyl methacrylate; acrylonitrile, methacrylonitrile, acrylamide, vinyl ethers, inclusive of vinyl methyl ether, vinyl isobutyl ether, and vinyl ethyl ether, vinyl ketones inclusive of vinyl methyl ketone, vinyl hexyl ketone and methyl isopropenyl ketone; vinylidene halides such as vinylidene chloride, and vinylidene chlorofluoride; N-vinyl indole, N-vinyl pyrrolidene, mixtures thereof; and the like.

Generally, from about 1 part to about 5 parts by weight of toner particles are mixed with from about 100 to about 300 parts by weight of the carrier particles.

Numerous well known suitable pigments or dyes can be selected as the colorant for the toner particles including, for example, carbon black, such as REGAL 330®, nigrosine dye, lamp black, iron oxides, magnetites like MAPICO BLACK®, and mixtures thereof. The pigment, which is preferably carbon black, should be present in a sufficient amount to render the toner composition highly colored. Thus, the pigment particles can be present in amounts of from about 2 percent by weight to about 20 percent by weight, based on the total weight of the toner composition, however, lesser or greater amounts of pigment particles may be selected.

When the pigment particles are comprised of magnetites, which are a mixture of iron oxides ($FeO.Fe_2O_3$) including those commercially available as MAPICO BLACK®, they are present in the toner composition in an amount of from about 10 percent by weight to about 70 percent by weight, and preferably in an amount of from about 20 percent by weight to about 50 percent by weight.

The resin particles are present in a sufficient, but effective amount, thus when 10 percent by weight of pigment or colorant, such as carbon black, is contained therein, about 90 percent by weight of resin material is selected. Generally, however, providing the features of the present invention are achieved, the toner composition is comprised of from about 85 percent to about 97 percent by weight of toner resin particles, and from about 3 percent by weight to about 15 percent by weight of pigment particles such as carbon black.

Also, there can be selected as pigments or colorants, magenta, cyan and/or yellow particles, as well as mixtures thereof. More specifically, illustrative examples of magenta materials that may be selected as pigments include 1,9-dimethyl-substituted quinacridone and anthraquinone dye identified in the Color Index as Cl 60720, Cl Dispersed Red 15, a diazo dye identified in the Color Index as Cl 26050, Cl Solvent Red 19, and the like. Examples of cyan materials that may be used as pigments include copper tetra-4(octaecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like, while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. These pigments are generally present in the toner composition in an amount of from about 1 weight percent to about 15, and preferably 5 weight percent based on the weight of the toner resin particles.

For further enhancing the positive charging characteristics of the toner compositions described herein, and as optional components there can be incorporated therein or thereon in embodiments, charge enhancing additives inclusive of alkyl pyridinium halides, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium methyl sulfate; and other similar known charge enhancing additives. These additives are usually incorporated into the toner in an amount of from about 0.1 percent by weight to about 20, and preferably from about 1 to about 5 weight percent.

With further reference to the process for generating the carrier particles illustrated herein, there is initially obtained, usually from commercial sources, the uncoated carrier core and the polymer powder mixture coating. The individual components for the coating are available, for example, from Pennwalt as KYNAR 301F®, Allied Chemical as POLYMIST B6®, and other sources. Generally, these polymers are blended in various proportions as mentioned herein as, for example, in a ratio of 1:1, 0.1 to 0.9, and 0.5 to 0.5. The blending can be accomplished by numerous known methods including, for example, a twin shell mixing apparatus. Thereafter, the carrier core polymer blend is incorporated into a mixing apparatus, about 1 percent by weight of the powder to the core by weight in an embodiment and mixing is affected for a sufficient period of time until the polymer blend is uniformly distributed over the carrier core, and mechanically or electrostatically attached thereto. Subsequently, the resulting coated carrier particles are metered into a rotating tube furnace, which is maintained at a sufficient temperature to cause melting and fusing of the polymer blend to the carrier core.

The following examples are being supplied to further define the present invention, it being noted that these examples are intended to illustrate and not limit the scope of the present invention. Parts and percentages are by weight unless otherwise indicated. In these Examples there was selected the kiln as shown in the Figures, and more specifically the kiln was obtained from Harper Electric Furnace Company, Model NOV7078-RT-18; 20 magnets, (1 inch, by 1 inch by ¾ inches thick) in 10 rows, 2 magnets to each row on a 3 inch heat resistant continuous transporting rubber belt. The belt was about 10 inches wide and mounted onto the cooling section of the rotating kiln tube at a rotation speed of 6 RPM with a transporting speed of 3.6 feet per minute providing about 12 lifts per minute with about 15 percent of the polymer powder mixture being lifted with each lift. The temperature of the kiln bed was 262° C. The material exiting the kiln was at a temperature of about 45° C. No agglomerates of carrier powder comprised of iron powder and the polymer coating or coatings formed, and this material product could be passed easily through a 150 micron screen.

EXAMPLE I

There were prepared carrier particles by coating 68,040 grams of a Toniolo atomized steel core, 120 microns in diameter, with 680 grams of a polyvinylidene fluoride, available as KYNAR 301F®, 1 percent coating weight, by mixing these components for 60 minutes in a Munson MX-1 Minimixer, rotating at 27.5 RPM. There resulted uniformly distributed and electrostatically attached, as determined by visual observation, on the carrier core the polyvinylidene fluoride. Thereafter, the resulting carrier particles were metered into a rotating tube furnace at a rate of 105 grams/minute. This furnace was maintained at a temperature of 262° C. thereby causing the polymer to melt and fuse to the core. The carrier mixture resulting was then provided to the operating kiln of FIG. 1, and processed as indicated herein, and wherein the transporting speed was 3.6 feet per minute providing about 12 lifts per minute with about 15 percent of the polymer powder mixture being lifted with each lift. The temperature of the kiln bed was 262° C. The material exiting the kiln was at a temperature of about 45° C. No agglomerates of carrier powder comprised of iron powder and the polymer coating or coatings formed, and this material product could be passed easily through a 150 micron screen.

A developer composition was then prepared by mixing 97.5 grams of the above prepared carrier particles with 2.5 grams of a toner composition comprised of 92 percent by weight of a styrene n-butylmethacrylate copolymer resin, 58 percent by weight of styrene, 42 percent by weight of n-butylmethacrylate, and 6 percent by weight of carbon black, and 2 percent by weight of the charge additive cetyl pyridinium chloride. Thereafter, the triboelectric charge on the carrier particles was determined by the known Faraday Cage process, and there was measured on the carrier a charge of −68.3 microcoulombs per gram. Further, the conductivity of the carrier as determined by forming a 0.1 inch long magnetic brush of the carrier particles, and measuring the conductivity by imposing a 10 volt potential across the brush, was $10^{-15}$ mho-cm$^{-1}$.

In all the working Examples, the triboelectric charging values and the conductivity numbers were obtained in accordance with the aforementioned procedure.

EXAMPLE II

The procedure of Example I was repeated with the exception that 102.0 grams, 0.15 percent coating weight, of polyvinyl fluoride was used. There resulted on the carrier particles a triboelectric charge thereon of −33.7 microcoulombs per gram. Also, the carrier particles had a conductivity of $10^{-9}$ mho-cm$^{-1}$.

EXAMPLE III

A developer composition of the present invention is prepared by repeating the procedure of Example I with the exception that there is selected as the carrier coating 680 grams of a polymer blend at a 1.0 percent coating weight of a polymer mixture, ratio 1:9 of polyvinylidene fluoride, KYNAR 301F®, and polyethylene, available as POLYMIST B6® from Allied Chemical. There can result on the carrier particles a triboelectric charge of −17.6 microcoulombs per gram. Also, the carrier particles can possess a conductivity of $10^{-15}$ mho-cm$^{-1}$.

EXAMPLE IV

A developer composition is prepared by repeating the procedure of Example III with the exception that there is selected as the carrier coating a polymer mixture, ratio 9:1, of polyvinylidene fluoride, KYNAR 301F®, and polyethylene, available as POLYMIST B6®. About 680 grams of the polymer blend, that is a 1.0 percent coating weight, is selected. There can result on the carrier particles a triboelectric charge of −63 microcoulombs per gram, and the insulating carrier particles can possess a conductivity of $10^{-15}$ mho-cm$^{-1}$.

EXAMPLE V

A developer composition is prepared by repeating the procedure of Example III with the exception that there is selected as the carrier coating a blend, ratio 3:2, of a polymer mixture of polyvinylidene fluoride, KYNAR 301F®, and high density 10.962 grams/milliliters of polyethylene MICROTHENE FA520®, available from USI Chemical Company. About 340 grams of the polymer blend, that is a 0.5 percent coating weight, is added. There can result on the carrier particles a triboelectric charge of −29.8 microcoulombs per gram. Also, the resulting carrier particles can possess a conductivity of $10^{-14}$ mho-cm$^{-1}$.

EXAMPLE VI

A developer composition is prepared by repeating the procedure of Example III with the exception that there is selected as the carrier coating a blend, ratio 7:3, of a polymer mixture of copolyvinylidene fluoride tetrafluoroethylene, available from Pennwalt as KYNAR 7201®, and a high density, 0.962 gram per milliliter, of polyethylene available as MICROTHENE FA520® from USI Chemical Company. About 272 grams of the polymer blend, that is a 0.4 percent coating weight, is added. There can result on the carrier particles a triboelectric charge of −47.6 microcoulombs per gram. Also, the resulting carrier particles can possess a conductivity of $10^{-14}$ mho-cm$^{-1}$.

EXAMPLE VII

A developer composition is prepared by repeating the procedure of Example VI with the exception that there is selected as the carrier coating a blend, ratio 7:3, of a polymer mixture of copolyvinylidene fluoride tetrafluoroethylene, available from Pennwalt as KYNAR 7201®, and a low density, 0.924 gram per milliliter, polyethylene available from USI Chemicals Company as FN510®. About 476 grams of the polymer blend, that is a 0.7 percent coating weight, is added. There can result on the carrier particles a triboelectric charge of −42 microcoulombs per gram. Also, the resulting carrier particles can possess a conductivity of $10^{-15}$ mho-cm$^{-1}$.

EXAMPLE VIII

A developer composition is prepared by repeating the procedure of Example IV with the exception that there is selected as the carrier coating a blend, ratio 7:3, of a polymer mixture of KYNAr 7201®, and a copolyethylene vinylacetate, available from USI Chemical Company as FE532®. About 476 grams of the polymer blend, that is a 0.7 percent coating weight, is added. There can result on the carrier particles a triboelectric charge of −33.7 microcoulombs per gram. Also, the resulting carrier particles can possess a conductivity of $10^{-15}$ mho-cm$^{-1}$.

EXAMPLE IX

A developer composition was prepared by repeating the procedure of Example VIII with the exception that there was selected as the carrier coating a blend, ratio of 2:3, of a polymer mixture of a polyvinylidene fluoride available from Pennwalt as KYNAR 301F®, and a polymethyl methacrylate available from Fuji Xerox. About 476 grams of the polymer blend, that is a 0.7 percent coating weight, was added. There resulted on the carrier particles a triboelectric charge of −29.5 microcoulombs per gram. Also, the resulting carrier particles had a conductivity of $10^{-15}$ mho-cm$^{-1}$.

With further reference to the above Examples, the actual conductivity values were obtained as indicated herein. Specifically, these values were generated by the formation of a magnetic brush with the prepared carrier particles. The brush was present within a one electrode cell comprised of a magnet as one electrode and a nonmagnetic steel surface as the opposite electrode. A gap of 0.100 inch was maintained between the two electrodes and a 10 volts bias was applied in this gap. The resulting current through the brush was recorded and the conductivity was calculated based on the measured current and geometry.

More specifically, the conductivity in mho-cm$^{-1}$ is the product of the current, and the thickness of the brush, about 0.254 centimeter divided by the product of the applied voltage and the effective electrode area.

With insulating developers, there are usually obtained images of high copy quality with respect to both lines and halftones, however, solid areas are of substantially lower quality. In contrast, with conductive developers there are achieved enhanced solid areas with low line resolution and inferior halftones.

With respect to the measured triboelectric numbers in microcoulombs per gram, they can be determined by placing the developer materials in an 8 ounce glass jar with 2.75 percent by weight toner concentration, placed on a Red Devil Paint Shaker and agitated for 10 minutes. Subsequently, the jar was removed and samples from the jar were placed in a known tribo Faraday Cage apparatus. The blow off tribo of the carrier particles was then measured.

With the apparatus as described in the working Examples, there was enabled a number of advantages as illustrated herein, such as effective mixing of the carrier components, minimal or no undesirable carrier bead sticking, increased powder flow and thus improved carrier coating, a more rapid and a controlled cooling of the carrier components, minimization or avoidance of kiln tube clogging, and the like.

Other modifications of the present invention may occur to those skilled in the art subsequent to a review of the present application, and these modifications, including equivalents thereof, are intended to be included within the scope of the present invention.

What is claimed is:

1. A process for the preparation of carrier particles, which carrier particles are useful for electrophotographic processes, which comprises adding to an apparatus, which apparatus comprises in operative relationship a rotating kiln, a rotating roller means, a moving transport means, and a series of magnets attached to the transporting means, whereby the magnets attract and retain carrier components present in the rotating kiln, followed by release of carrier components into the rotating kiln; and wherein the transporting means is moving in a counterclockwise direction at a speed of from between about 1 to about 100 feet per minute, and the rotating kiln is moving at a speed of from between about 1 to about 30 revolutions per minute, a mixture comprised of carrier particles coated with at least one polymer; disengaging the apparatus; and removing carrier particles therefrom, and wherein the carrier particles are coated with said at least one polymer prior to addition of said particles to said apparatus.

2. A process in accordance with claim 1 wherein two polymers are selected for the coating.

3. A process in accordance with claim 2 wherein the polymers are not in close proximity in the triboelectric series.

4. A process in accordance with claim 2 wherein the first polymer is present in an amount of from between about 10 percent by weight to about 90 percent by weight, and the second polymer is present in an amount of from about 90 percent by weight to about 10 percent by weight.

5. A process in accordance with claim 4 wherein the polymer coating is comprised of first and second polymers selected from the group consisting of polystyrene and tetrafluoroethylene; polyethylene and tetrafluoroethylene; polyethylene and polyvinyl chloride; polyvinyl acetate and tetrafluoroethylene; polyvinyl acetate and polyvinyl chloride; polyvinyl acetate and polystyrene; and polyvinyl acetate and polymethyl methacrylate.

6. A process in accordance with claim 2 wherein the polymer coating is comprised of first and second polymers selected from the group consisting of polystyrene and tetrafluoroethylene; polyethylene and tetrafluoroethylene; polyethylene and polyvinyl chloride; polyvinyl acetate and tetrafluoroethylene; polyvinyl acetate and polyvinyl chloride, polyvinyl acetate and polystyrene; and polyvinyl acetate and polymethyl methacrylate.

7. A process in accordance with claim 1 wherein the carrier core is comprised of steel, iron, or a ferrite.

8. A process for the preparation of carrier particles using an apparatus comprising in operative relationship a rotating kiln, a rotating roller means, a moving transport means in contact with the rotating means and the roller means, and a series of magnets attached to the transporting means, whereby the magnets attract and retain carrier components present in the rotating kiln, followed by release of the carrier components into the rotating kiln, the transporting means moving in a counterclockwise direction at a speed of from between about 1 to about 100 feet per minute, and the rotating kiln moving at a speed of from between about 1 to about 30 revolutions per minute, the process comprising the steps of:

(a) adding a mixture of carrier particles coated with at least one polymer to the apparatus, the carrier particles being coated with said polymer prior to addition to said apparatus;

(b) attracting and retaining carrier particles, followed by release of the carrier particles into the rotating kiln using said series of magnets and said transporting means;

(c) disengaging said apparatus; and (d) removing carrier particles from said apparatus; wherein said process agitates the carrier particles to minimize agglomeration.

* * * * *